United States Patent [19]

Hara

[11] Patent Number: 5,547,496
[45] Date of Patent: Aug. 20, 1996

[54] ELECTROSTATIC PRECIPITATOR

[75] Inventor: Keiichi Hara, Taito-ku, Japan

[73] Assignee: Filtration Japan Co., Ltd., Yamagata-ken, Japan

[21] Appl. No.: 380,506

[22] Filed: Jan. 30, 1995

[30] Foreign Application Priority Data

Jan. 31, 1994 [JP] Japan .................. 6-028860

[51] Int. Cl.⁶ .................................................. B03C 3/08
[52] U.S. Cl. ........................... 96/79; 96/86; 96/87; 96/97
[58] Field of Search .................................. 96/79, 86, 87, 96/97

[56] References Cited

U.S. PATENT DOCUMENTS

| | | | |
|---|---|---|---|
| 1,882,949 | 10/1932 | Ruder | 96/72 |
| 1,912,053 | 5/1933 | Wintermute | 96/70 |
| 2,063,391 | 12/1936 | Malick | 96/88 |
| 3,086,341 | 4/1963 | Brandt | 96/34 |
| 3,729,815 | 5/1973 | Quintilian et al. | 29/592.1 |
| 3,958,961 | 5/1976 | Bakke | 261/116 X |
| 4,026,684 | 5/1977 | Finger | 55/487 X |
| 4,342,571 | 8/1982 | Hayashi | 96/76 |
| 4,526,591 | 7/1985 | Getzin | 55/300 X |
| 4,569,684 | 2/1986 | Ibbott | 96/79 |
| 5,248,324 | 9/1993 | Hara | 96/37 |

FOREIGN PATENT DOCUMENTS

| | | |
|---|---|---|
| 614871 | 12/1926 | France . |
| 372525 | 3/1923 | Germany . |
| 2118803 | 11/1972 | Germany . |
| 52-51172 | 4/1977 | Japan . |
| 63-171655 | 7/1988 | Japan . |
| 63-171654 | 7/1988 | Japan . |
| 3-1399 | 1/1991 | Japan . |
| 1528548 | 10/1978 | United Kingdom . |

*Primary Examiner*—Richard L. Chiesa
*Attorney, Agent, or Firm*—Oliff & Berridge

[57] ABSTRACT

An electrostatic precipitator has a plurality of arrays of spaced parallel dust-collecting electrodes, and at least one array of spaced parallel discharge electrodes, each array of discharge electrodes is arranged between an adjacent pair of arrays of dust-collecting electrodes. Each array of dust-collecting electrodes and each array of discharge electrodes are arranged such that the faces of the dust-collecting and discharge electrodes are parallel to each other, and parallel to the flow direction of a gas to be treated. The spacing between the dust-collecting electrodes of an array of dust-collecting electrodes, and the spacing between the discharge electrodes of an array of discharge electrodes may be sequentially narrowed from the upstream side of the electrostatic precipitator to the downstream side of the electrostatic precipitator. The spacing between adjacent arrays of dust-collecting and discharge electrodes may also be sequentially narrowed from the upstream side of the electrostatic precipitator to the downstream side of the electrostatic precipitator.

27 Claims, 8 Drawing Sheets

ELECTROSTATIC PRECIPITATOR

BACKGROUND OF THE INVENTION

1. Field of the Invention

The present invention relates to an electrostatic precipitator suitable for use in a power plant, a cement plant, an industrial waste incinerator, a road or a tunnel for removing floating particles or radioactive dust, or for cleaning indoor air.

2. Description of the Related Art

The electrostatic precipitator is based upon the principle that dust is caught in a discharge portion of a machine using a high voltage. In a casing of the electrostatic precipitator, discharge electrodes (or negative electrodes) for establishing a non-uniform electric field and dust-collecting electrodes for collecting the dust are spaced apart and arranged opposite each other. A high voltage is applied between the discharge electrodes and the dust-collecting electrodes, and electricity is discharged in the air between the electrodes. Both a positive and a negative discharge may be used, a positive discharge, however, produces less ozone.

Figure 14:
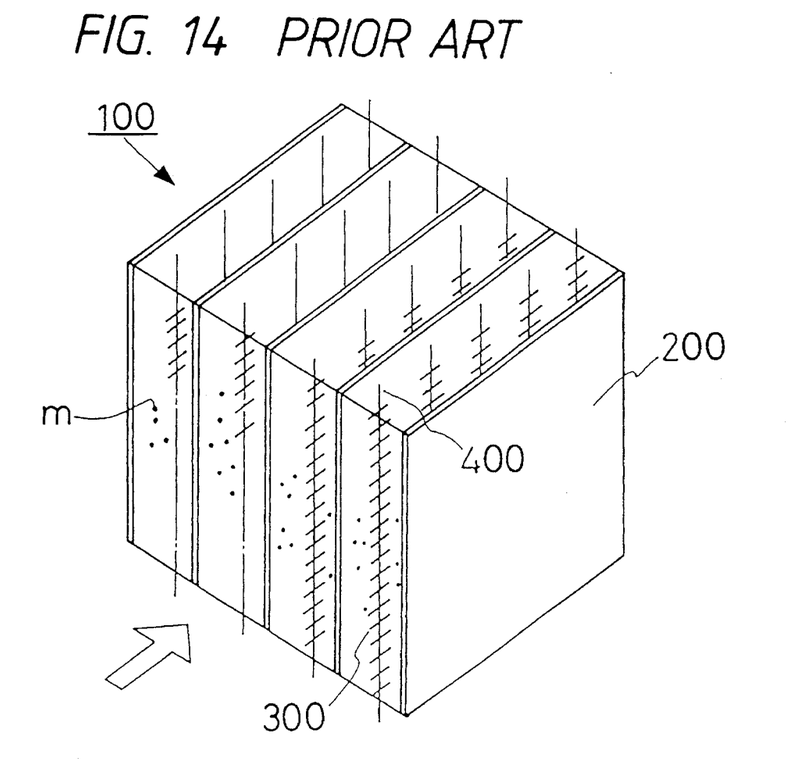
FIG. 14 is a perspective view showing a portion of an electrostatic precipitator of the prior art.

In a prior art electrostatic precipitator 100, shown in FIG. 14, a plurality of plate shaped metal dust-collecting electrodes 200 are positioned at a spacing so that their faces are parallel. A plurality of wires 400 each suspending a plurality of discharge electrodes 300 are interposed between the dust-collecting electrodes 200. The air to be treated is introduced between the electrodes, parallel with the faces of the dust-collecting electrodes 200. The discharge electrodes 300 may be supported not only by wires 400, but also by rods or pipes.

A high negative voltage is applied to the discharge electrodes 300 with respect to the dust-collecting electrodes 200 to establish a corona discharge in the air, thus forming charged zone between the dust-collecting and discharge electrodes. The air to be treated is passed through the charged zone to negatively charge dust particles m floating in the air. The charged dust particles m may then be collected and trapped by the dust-collecting electrodes 200, which are at a positive potential with respect to the dust particles m. In addition, the electrostatic precipitator 100 may be equipped with a blower for feeding the air to be treated.

Figure 15:
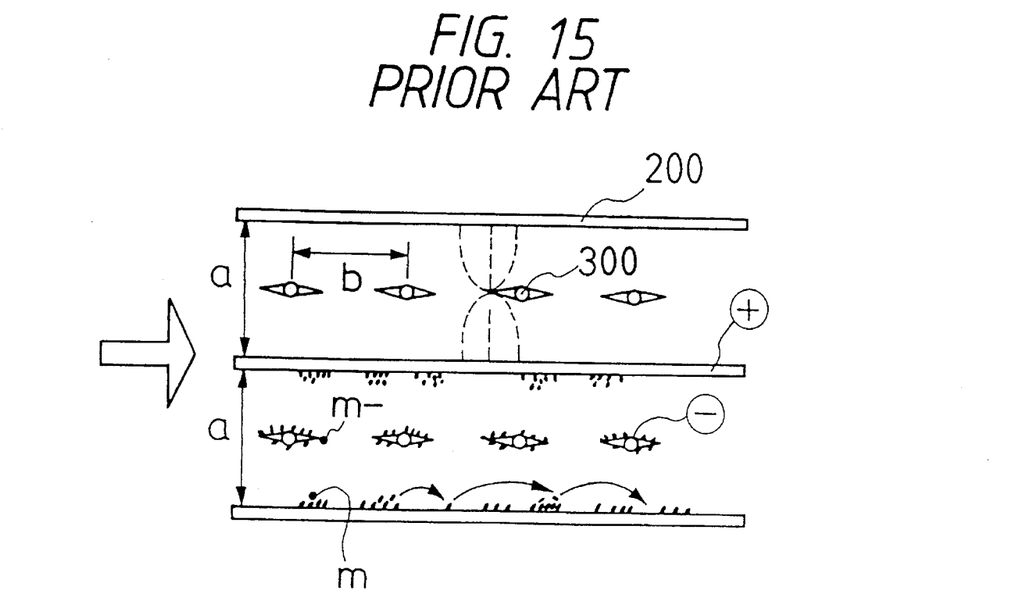
FIG. 15 is a top plan view showing the arrangement of the electrodes of FIG. 14.

In the apparatus thus constructed, as shown in FIG. 15, the dust-collecting electrodes 200 are disposed at an equal spacing a, and the discharge electrodes 300 are disposed at an equal spacing b between dust-collecting electrodes 200. When a high negative potential is applied to the discharge electrodes 300, a non-uniform electric field is established in the air between the electrodes by the corona discharge from the leading ends of the discharge electrodes 300. As a result, the ionized (charged) dust particles m are better collected by the portions of the dust-collecting electrodes 200 directly opposite the ends of the discharge electrodes 300, because of the large voltage difference between the ends of the discharge electrodes 300 and the dust-collecting electrodes 200.

Figure 16:
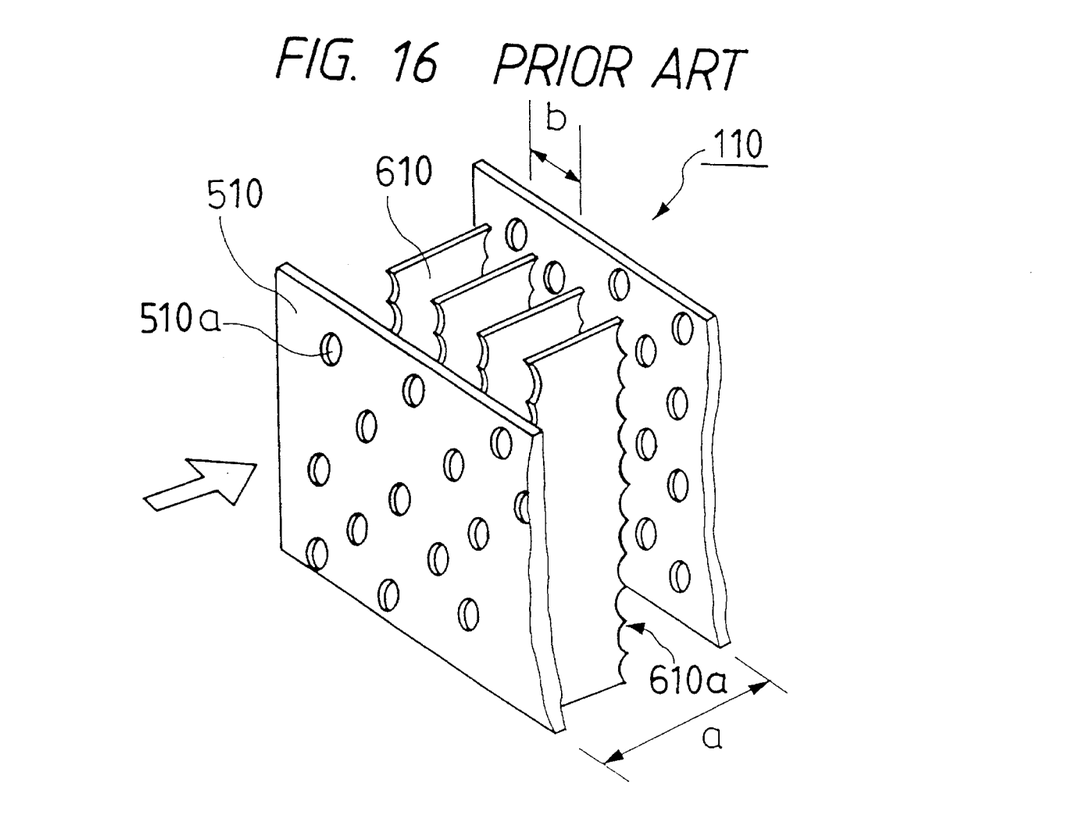
FIG. 16 is a perspective view showing the arrangement of the electrodes of another electrostatic precipitator of the prior art.

In another example of the prior art, as shown in FIG. 16, an electrostatic precipitator 110 includes dust-collecting electrodes 510 having faces formed with a plurality of apertures 510a. The dust-collecting electrodes 510 are arranged at a right angle with respect to the flow direction (arrow) of the air. The electrostatic precipitator includes a plurality of discharge electrodes 610 comprised of rectangular metal plates with saw-toothed portions 610a on their edges. The discharge electrodes 610 are arranged so that their faces are in parallel with the flow direction of the air.

As shown in FIG. 15, however, the dust particles m collected by the dust-collecting electrodes 200 tend to move slightly in the air flow direction. In addition, after a layer of dust particles m have coated the collecting faces of the dust-collecting electrodes 200, the surface of the layer of collected dust particles becomes slippery and dust particles to be collected by the dust collecting electrodes easily escape the trapping action of the electric field. Moreover, once a dust particle breaks away from an area near the ends of the discharge electrodes, where the electric field is strong, it floats downstream past an area where the electric field is weak, and the electrostatic precipitator fails to provide a high cleaning percentage.

In addition, the dust particles to be collected may be partially ionized, thus becoming inversely ionized particles, as indicated by $m^-$. The inversely ionized particles $m^-$ may be collected by the discharge electrodes 300 in the non-uniform electric field. In a case where, for example, the discharge electrodes 300 have faces opposed to the dust-collecting electrodes 200, as shown in FIG. 15, the non-uniform electric field may be established so that many inversely ionized particles $m^-$ are collected by the discharge electrodes 300 (as shown in the lower portion of FIG. 15). As a result, a clogging phenomena may occur, wherein dust particles are collected by the ionizing lines (or the discharge electrodes). This clogging phenomena causes the problem that the discharge current is weakened.

In the apparatus shown in FIG. 16, on the contrary, there is proposed a device (as disclosed in Japanese Patent Application Laid-open No. 31399/1991) for vibrating the dust-collecting electrodes 510 so as to prevent the clogging phenomenon. When this vibrator acts, however, portion of the collected dust particles m are undesirably floated in the air.

With the dust-collecting electrodes 200 arranged in parallel with the flow direction, on the other hand, the discharge electrodes 300 may be arranged in multiple stages so that the dust left uncollected by an upstream stage may be removed at a downstream stage. Unfortunately the downstream stage has a low collecting percentage. This is because larger dust particles have a higher charging capacity and are more likely to be immediately collected at the upstream side, whereas smaller dust particles have a lower charging capacity and are less likely to be collected at the upstream or downstream sides. If the spacing between the different kinds of electrodes were gradually narrowed toward the downstream side, the electric field would be accordingly intensified to collect the smaller dust particles at the downstream side. Since, however, the spacing a is unchanged at the downstream side, the efficiency is not high. Because it is structurally impossible to narrow the spacing, the efficiency is low for the large depth.

The discharge electrodes 610 shown in FIG. 16 have a one-stage structure in the flow direction, and these structures have to be arranged in multiple stages so as to enhance the efficiency. The multiple stages cause the depth of the electrostatic precipitator to be enlarged, thus raising a problem in the space required for the installation. In addition, when the plate-shaped electrodes are vertically extended, it is necessary to prevent the electrodes from bulging in a direction perpendicular to the faces of the electrodes. If recessed, on the contrary, the dust-collecting efficiency is deteriorated.

SUMMARY OF THE INVENTION

An object of the present invention is to provide an electrostatic precipitator which is easy to assemble and which has improved air cleaning efficiency.

In order to achieve the above-specified object, according to the present invention, there is provided an electrostatic precipitator that includes a plurality of arrays of spaced parallel dust-collecting electrodes. Each array (hereinafter referred to as a "dust-collecting electrode group") is comprised of a plurality of rectangular dust-collecting electrodes arranged so that their faces extend vertically and are opposed to each other. The dust-collecting electrode group includes first spacing-adjusting means for fixing the rectangular dust-collecting electrodes in each group at a predetermined spacing from each other. The dust-collecting electrode groups are sequentially arranged in the electrostatic precipitation at a predetermined spacing from each other such that the faces of the dust-collecting electrodes are parallel to the flow direction of the gas passing through the electrostatic precipitator.

The electrostatic precipitator also includes a plurality of arrays of discharge electrodes. Each array (hereinafter referred to as a "discharge electrode group") includes a plurality of rectangular discharge electrodes having saw-toothed portions at their edges. The discharge electrodes are juxtaposed to each other so that their faces extend vertically and are opposed to each other. The discharge electrode group includes second spacing-adjusting means for fixing the rectangular discharge electrodes in each group at a predetermined spacing from each other. The discharge electrode groups are sequentially arranged at a predetermined spacing from each other and are arranged so that the faces of the discharge electrodes are parallel to the flow direction of a gas passing through the electrostatic precipitator. The discharge electrode groups are interposed at a predetermined spacing between adjacent pairs of the dust-collecting electrode groups.

In the above-specified construction, moreover, the predetermined spacings between the dust-collecting electrodes and the predetermined spacings between the discharge electrodes, which are fixed by the first and second spacing adjusting means, are sequentially narrowed from the upstream side of the electrostatic precipitator to the downstream side. The predetermined spacings between the dust-collecting electrode groups and the discharge electrode groups are also sequentially narrowed from the upstream side of the electrostatic precipitator to the downstream side.

Under the above constitution, according to the present invention, the dust-collecting electrode groups and the discharge electrode groups are arranged sequentially, and alternately, in the flow direction of the gas. This arrangement can be achieved by first constructing the dust-collecting electrode groups and the discharge electrode groups utilizing spacers (or the spacing-adjusting means) and then mounting the dust-collecting and discharge electrode groups in a casing. The casing may be equipped with a plurality of mounting brackets (or spacing-adjusting means) juxtaposed transversely of the air passage for mounting the plurality of dust-collecting electrodes and the plurality of discharge electrodes separately. In the multistage construction, too, the assembly can be made in a similar manner.

Since, in this case, the electrodes at an equal potential are connected by the predetermined spacing-adjusting means, the spacing between the electrodes need not be considered at the assembling time. Moreover, the electrodes at the equal potential are positioned in the bulging direction, so no structural problem is caused by the warping phenomenon.

The dust-collecting electrode groups and discharge electrode groups, thus arranged, have their plate-end-portions opposed to each other so that each discharge electrode group discharges electricity toward the two adjacent dust-collecting electrode groups arranged at the upstream and downstream sides. As a result of this electrical discharge, dust particles in the air tend to be more attracted to the downstream edges of the electrodes of the dust-collecting electrode group arranged at the upstream side of each discharge electrode group, rather than the dust-collecting electrode group on the downstream side of the discharge electrode groups. Even if the upstream edges of the electrodes of a downstream dust-collecting electrode group are confronted by a discharge electrode group, they tend to collect little dust because they are exposed to a flow of air that has already been cleaned by an upstream dust-collecting electrode group. Moreover, the dust, if collected, can be easily dropped by vibrating the dust-collecting electrode groups. Incidentally, the dust-collecting electrode groups are arranged downstream of the discharge electrode groups to reinforce the casing.

By the first and second spacing adjusting means, the spacing between the individual dust-collecting electrodes and discharge electrodes of the dust-collecting electrode groups and the discharge electrode groups can be sequentially narrowed from the upstream side to the downstream side of the electrostatic precipitator to increase the electric field intensity and the current density at the downstream side, thereby enhancing the performance of the multistage dust-collecting function. Moreover, the spacing between the dust-collecting electrode groups and the discharge electrode groups can also be sequentially narrowed from the upstream to the downstream side of the gas passage to improve the performance of the multistage dust-collecting function.

From the above constitution, the spacing between electrodes of the same kind and different kinds can be sequentially narrowed in the dust-collecting electrode groups and the discharge electrode groups arranged at the downstream side to increase the electric field intensity and the current density applied to the dust at the downstream side.

DETAILED DESCRIPTION OF THE PREFERRED EMBODIMENTS

Figure 1:
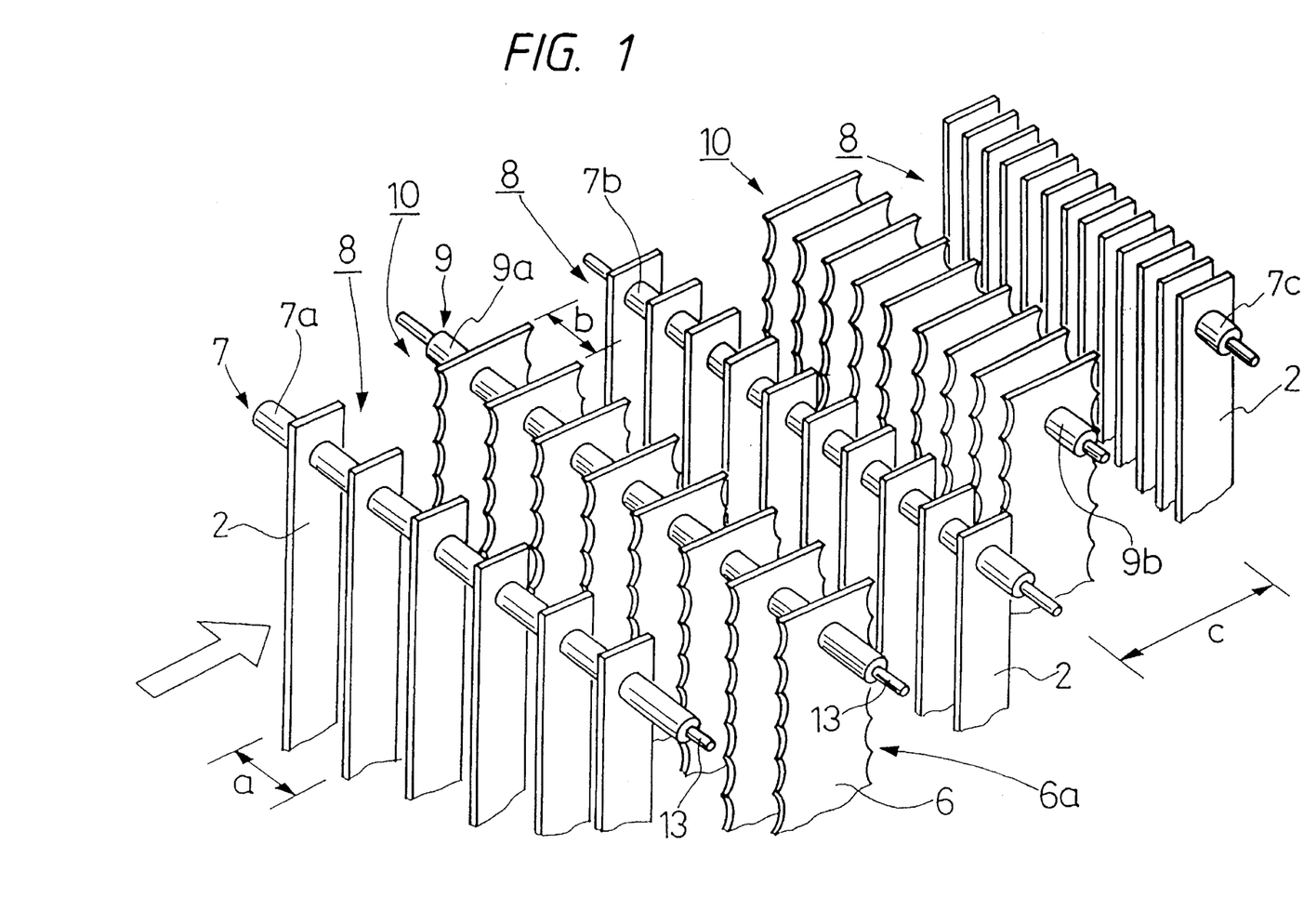
FIG. 1 is a perspective view showing a portion of an electrostatic precipitator according to an embodiment of the present invention.

The present invention will be described in connection with several embodiments and with reference to the accompanying drawings. As shown in FIG. 1, a plurality of dust-collecting electrodes 2, in a shape of rectangular plates, are connected between spacers (or spacing-adjusting means) 7 (7a, 7b and 7c) to form an array 8 of dust-collecting electrodes (hereinafter referred to as "dust-collecting electrode group 8"). A plurality of discharge electrodes 6, having saw-toothed portions 6a at alternate edges, are connected between spacers (or spacing-adjusting means) 9 (9a and 9b) to form an array of discharge electrodes 10 (hereinafter referred to as "discharge electrode group 10"). The dust-collecting electrodes 2 and the discharge electrodes 6 are made of electrically conductive metal (such as flat steel). The spacing between the dust-collecting electrode groups 8 and the discharge electrode groups 10, and the sizes of the spacers 7 and 9 are selected to enhance the air cleaning efficiency of the electrostatic precipitator.

Figure 2:
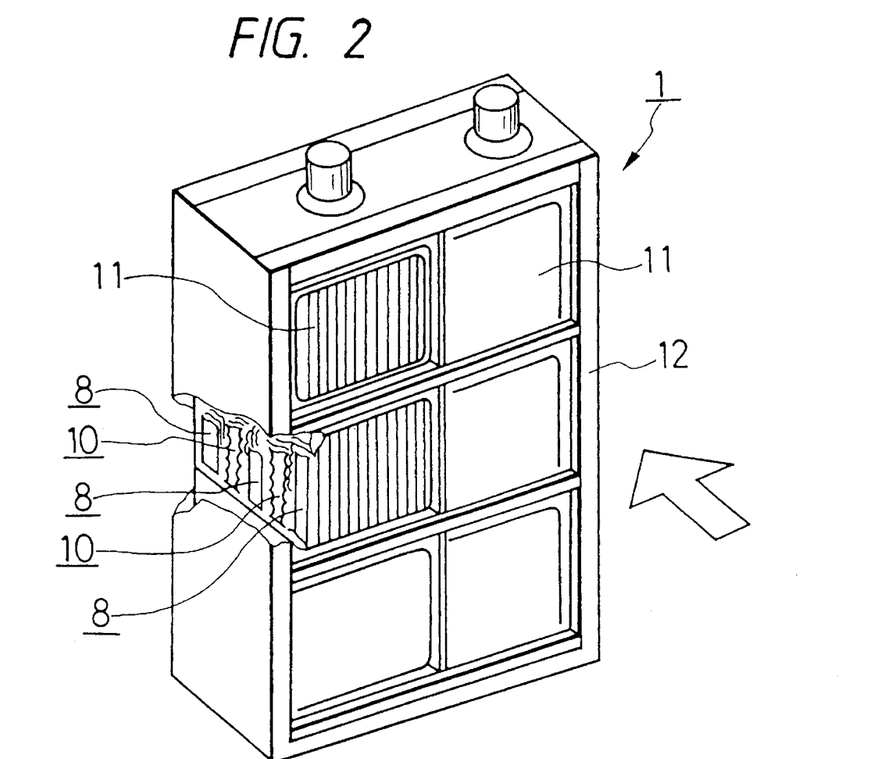
FIG. 2 is a perspective view showing the electrostatic precipitator of FIG. 1.

In the electrostatic precipitator 1, as shown in FIG. 2, a plurality of stages of units 11, in which discharge electrode groups 10 are arranged and fixed between adjacent pairs of dust-collecting electrode groups 8, are suspended from a casing 12. As shown in FIG. 1, the dust-collecting electrode groups 8 and the discharge electrode groups 10 are fixed in the unit 11 by means of screws 13 extending from the end portions of the spacers 7 and 9. A negative electrode at a high negative voltage is connected to the discharge electrode groups 10, and a positive electrode is connected to the dust-collecting electrode groups 8. The air to be treated by the electrostatic precipitator is introduced between the electrodes by a blower.

Figure 3:
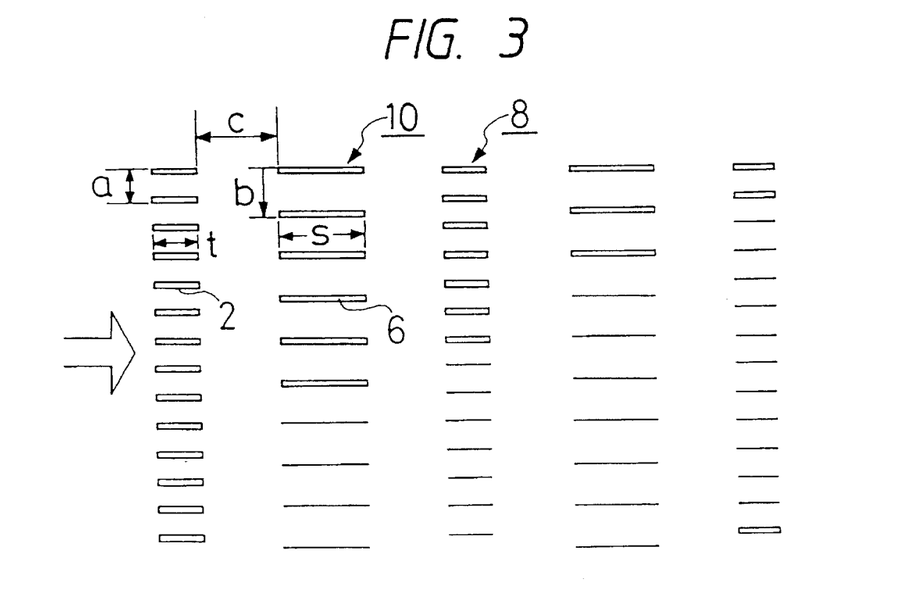
FIG. 3 is a top plan view showing the arrangement of dust-collecting electrodes and discharge electrodes of the electrostatic precipitator shown in FIG. 1.

The sizes and arrangements of the individual dust-collecting electrodes 2 and the discharge electrodes 6 of the dust-collecting electrode groups 8 and the discharge electrode groups 10 are selected, as shown in FIG. 3, such that the width s of the discharge electrodes 6 is about two times as large as the width t of the dust-collecting electrodes 2. The spacing c between the dust-collecting electrodes 2 and the discharge electrodes 6 is about two times as large as the width of the dust-collecting electrodes 2. The spacing a between the dust-collecting electrodes 2 is smaller than the width t of the dust-collecting electrodes. The spacing b between the discharge electrodes 6 is larger than the spacing between the dust-collecting electrodes 2. According to the inventor's past experiences, the dust-collecting electrodes 2 are frequently sized to have a width of between approximately 10 and 100 mm and a thickness of between approximately 0.5 and 50 mm. The discharge electrodes 6 are frequently sized to have a thickness of between approximately 0.3 to 2 mm. Incidentally, as the discharge electrodes 6 are made thinner, the electrical discharge effect is enhanced.

Figure 4:
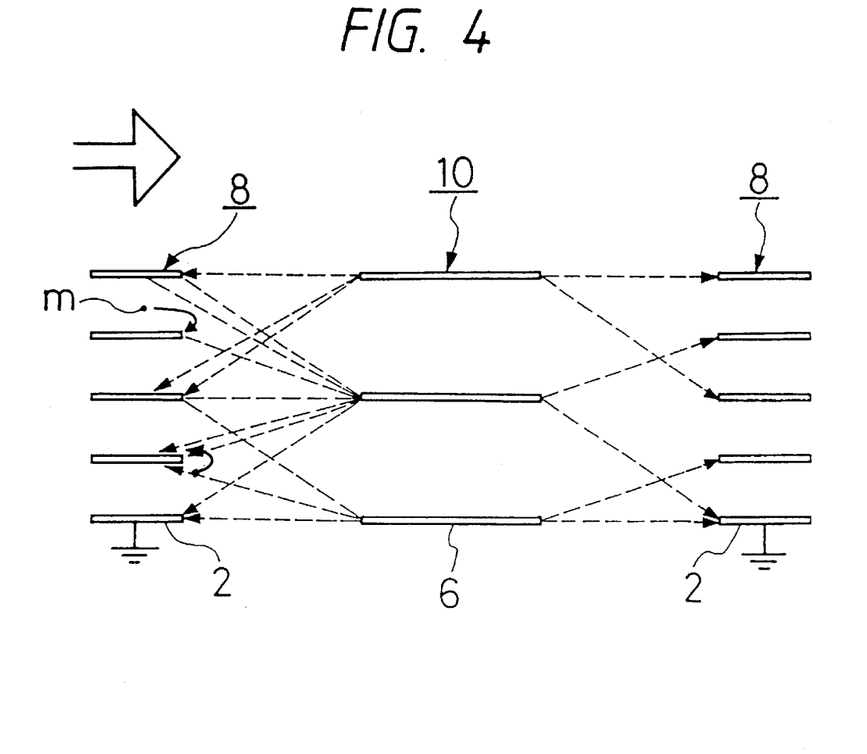
FIG. 4 is a top plan view illustrating the actions of dust-collecting electrodes and discharge electrodes of the electrostatic precipitator shown in FIG. 1.

When a high voltage is applied to a discharge electrode group 10 arranged between a pair of dust-collecting electrode groups 8, as shown in FIG. 4, a discharge current flows between the discharge and dust-collecting electrode groups and establishes a stereoscopic, complicated, non-uniform electric field. Since the discharge electrodes 6 of the discharge electrode group 10 have their adjoining faces held at an equal potential, no electric field is established that would drastically reduce the collection of inversely charged particles $m^-$ by the dust-collecting electrode groups 8. Charged dust particles m are attracted by and deposited on the downstream edges of the electrodes 2 of the dust-collecting electrode groups 8, which are opposite the upstream edges of the electrodes 6 of the discharge electrode groups 10. After a layer of dust particles m builds up on the dust collecting electrodes, the surface of the dust particle layer becomes slippery and dust particles to be collected by the dust collecting electrodes easily escape the trapping action of the electric field. However, the dust particles m are attracted against the gas flow onto the downstream edges of the electrodes 2 of the dust-collecting electrode groups 8 by the action of the discharging electric field. When the dust particles m aggregate and deposit to the point that they cannot be held by the attracting force, the particles drop down. Thus, the air is cleaned.

Moreover, since the dust-collecting electrodes 2 have vertical faces, and since the electric field is non-uniform, the collected dust particles m drop without moving to an adjoining dust-collecting electrode 2. Since the discharge electrode groups 10 have little deposition of the inversely charged particles $m^-$, they have a low resistance to the discharge, and the discharge electrodes can maintain a high discharge current, thus extending the lifetime of the apparatus.

Figure 5:
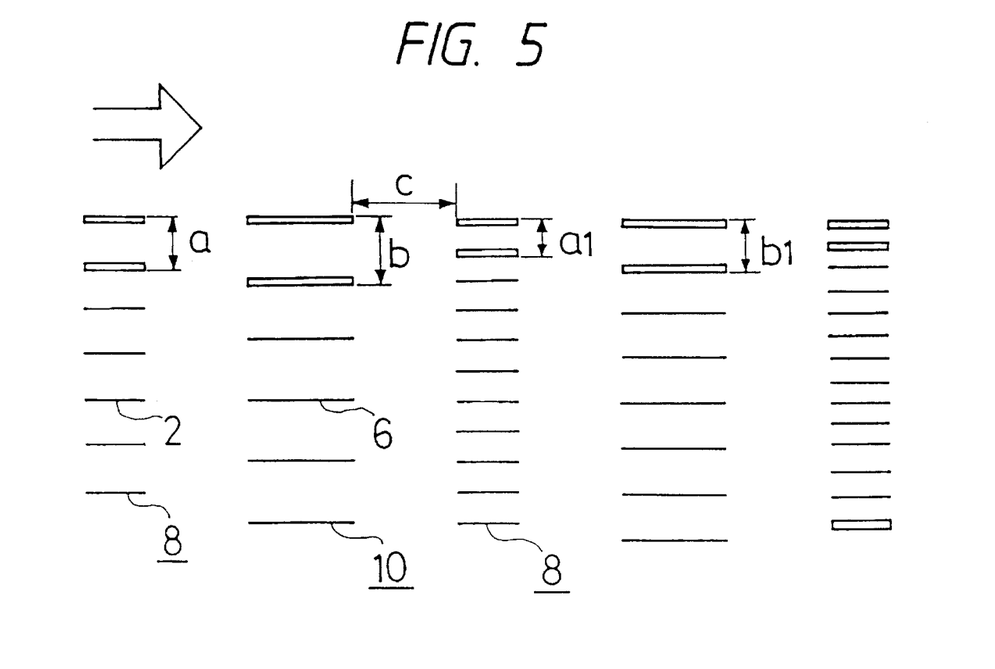
FIG. 5 is a top plan view of an embodiment in which the spacing between electrodes is varied.

The relationship between the dust-collecting electrode groups 8 and the discharge electrode groups 10 of the electrostatic precipitator 1 will now be described with reference to FIG. 5. The spacers 7 (as shown in FIG. 1) used for connecting the dust-collecting electrodes 2, are made shorter (a >a1, as shown in FIG. 5) the farther downstream in the air flow they are located. The spacers 9 (as shown in FIG. 1) used for connecting the discharge electrodes 6 are made shorter (b>b1, as shown in FIG. 5) the farther downstream in the air flow they are located. In short, the spacings between the electrodes can be narrowed for the electrodes located downstream to increase the current density. As a result, even small dust particles of small charging capacity can be collected.

Figure 6:
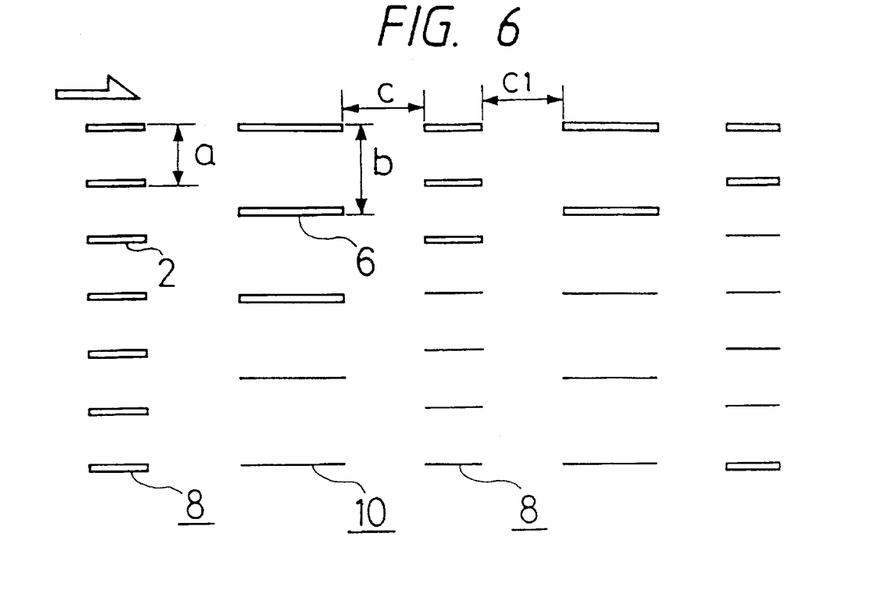
FIG. 6 is a top plan view of an embodiment in which the spacing between electrode groups is varied in the gas flow direction.

On the other hand, as shown in FIG. 6, the spacing between the electrodes of different kinds of electrode groups can be progressively narrowed the further downstream the electrode groups are located (c>c1 in FIG. 6). As a result, the field intensity can be strengthened downstream to collect even dust particles m of small size. Moreover, the electrodes arranged downstream can be arranged so that the spacing between electrodes of the same kind and of different kinds are narrowed so that the field intensity applied to the dust particles, and the current density, can be increased in the downstream portions of the electrostatic precipitator, thus improving the air cleaning efficiency.

Figure 7:
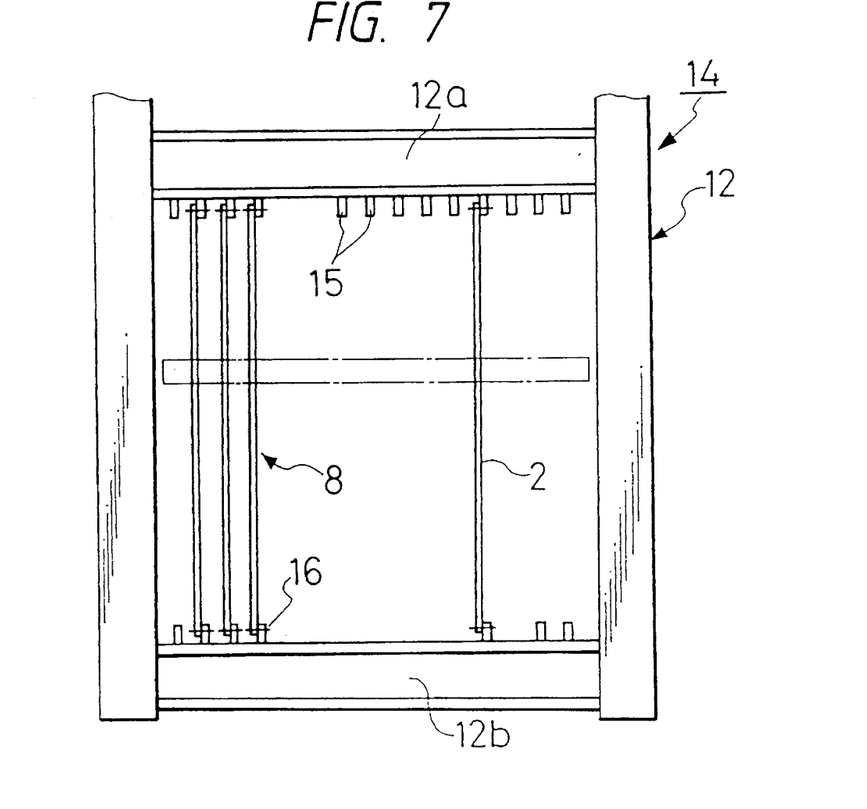
FIG. 7 is a front elevation view showing a dust-collecting block of another embodiment of the invention.
Figure 10:
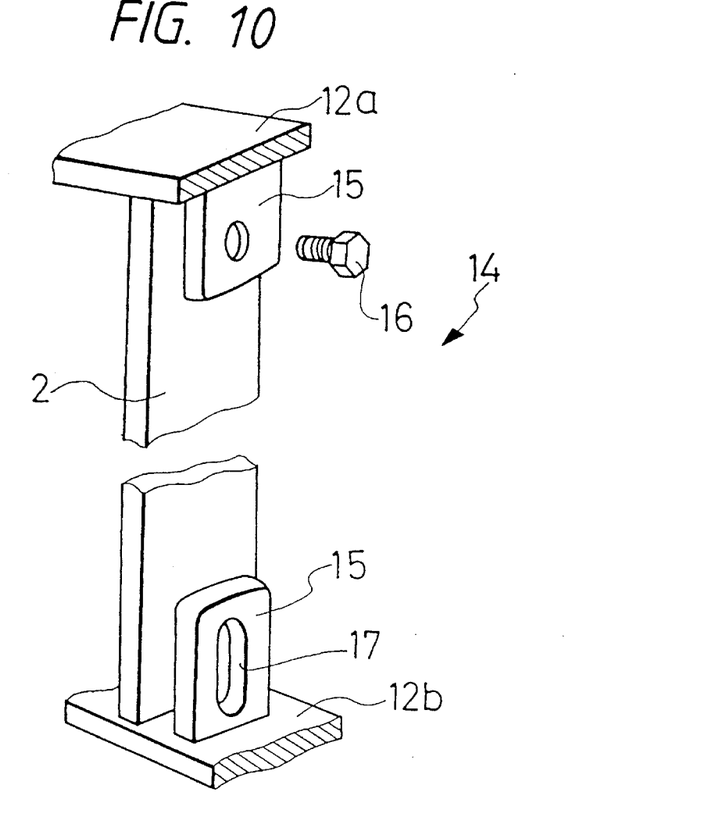
FIG. 10 is a perspective view showing a structure for mounting the dust-collecting electrodes shown in FIG. 7.

FIG. 7 shows a dust-collecting block 14, in which vertically elongated dust-collecting electrodes 2 are directly attached to the casing 12. On the upper frame 12a and the lower frame 12b of the casing 12, there are juxtaposed a plurality of mounting brackets 15 (or spacing-adjusting means). The mounting brackets 15 have a predetermined spacing and are equipped with screws 16 (as shown in FIG. 10) for fastening the plurality of dust-collecting electrodes 2 to the casing 12 to construct the dust-collecting electrode groups 8. As shown in FIG. 10, moreover, the mounting brackets 15 mounted on the lower frame 12b are formed with slots 17 for adjusting the tension in the dust-collecting electrodes 2.

Figure 11:
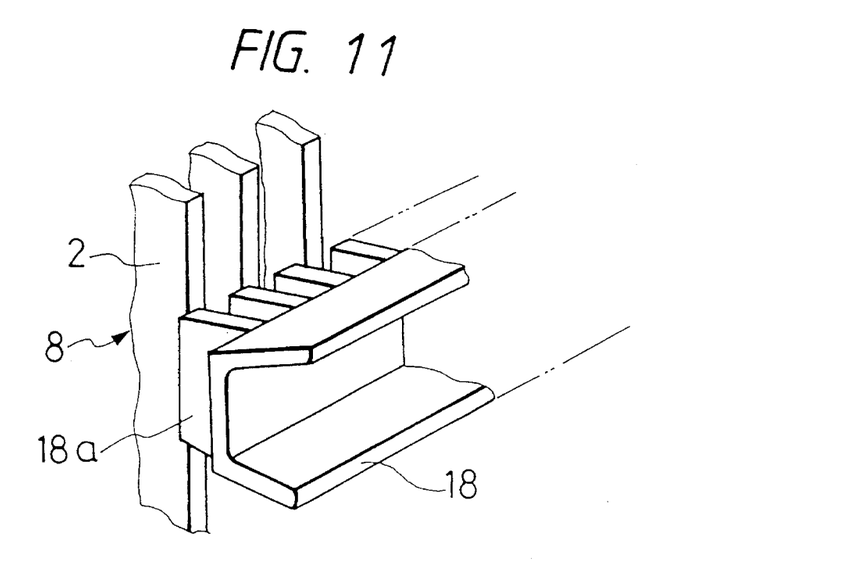
FIG. 11 is a perspective view showing a portion of a comb-shaped guide frame for supporting the central portion of the dust-collecting electrodes shown in FIG. 7.
Figure 12:
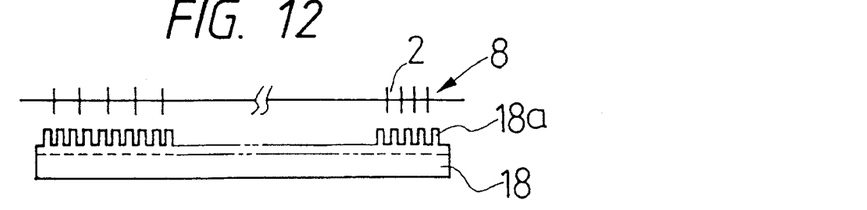
FIG. 12 is a top plan view showing the arrangement of the dust-collecting electrodes of FIG. 7 and the comb-shaped guide frame.

To the central portions of the dust-collecting electrodes 2, however, there is attached a comb-shaped guide frame 18, which is equipped with a plurality of teeth 18a juxtaposed to be inserted between the dust-collecting electrodes 2, as shown in FIGS. 11 and 12. As a result, the dust-collecting electrodes 2 can be prevented from warping so that the collected dust can be dropped down by vibrating the comb-shaped guide frame 18.

Figure 8:
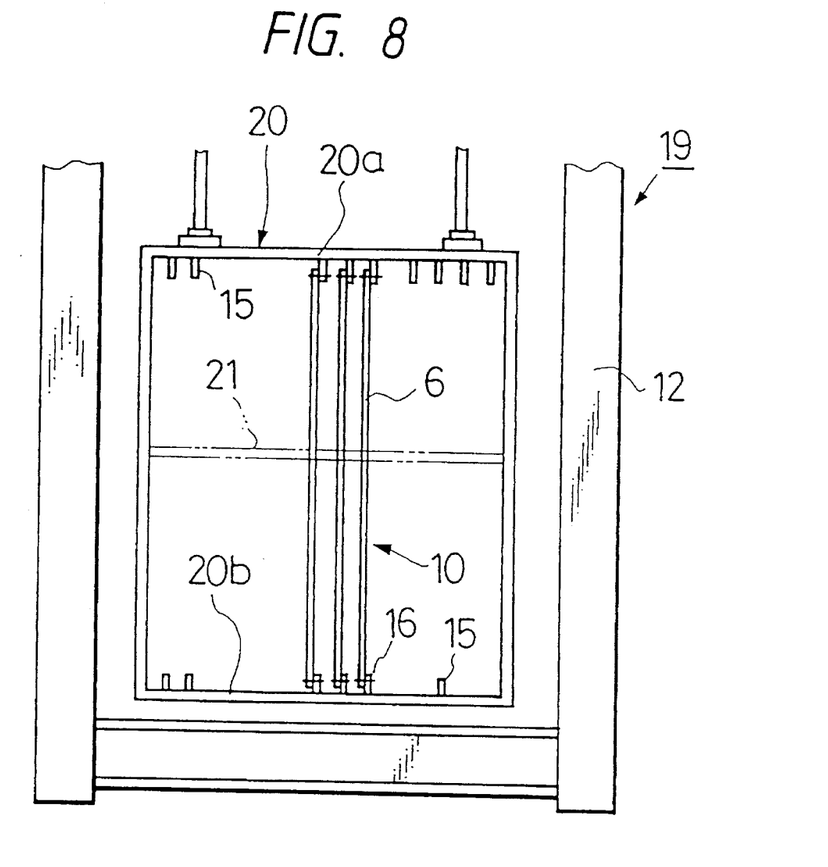
FIG. 8 is a front elevation view showing a discharge block of another embodiment of the invention.
Figure 13:
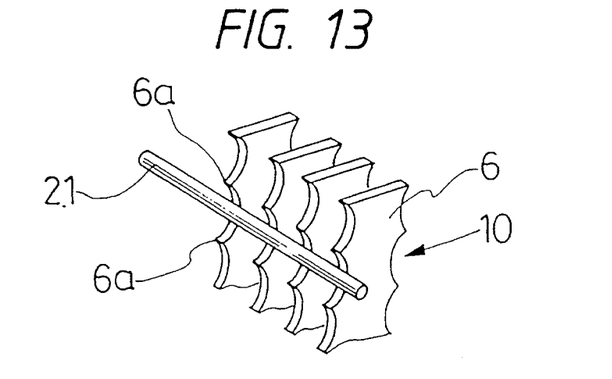
FIG. 13 is a perspective view showing a portion of a guide rod for supporting the central portions of the discharge electrodes shown in FIG. 8.

FIG. 8 shows a discharge block 19, in which vertically elongated discharge electrodes 6 are directly attached to a frame 20 suspended from the casing 12. The frame 20 has its upper frame 20a and lower frame 20b equipped with a plurality of mounting brackets 15 (or spacing-adjusting means). A plurality of discharge electrodes 6 are attached to the plurality of mounting brackets 15 by means of screws 16 (as shown in FIG. 10). A guide rod 21 is arranged along the saw-toothed portions 6a to stabilize the central portions of the discharge electrodes 6, as shown in FIG. 13.

Figure 9:
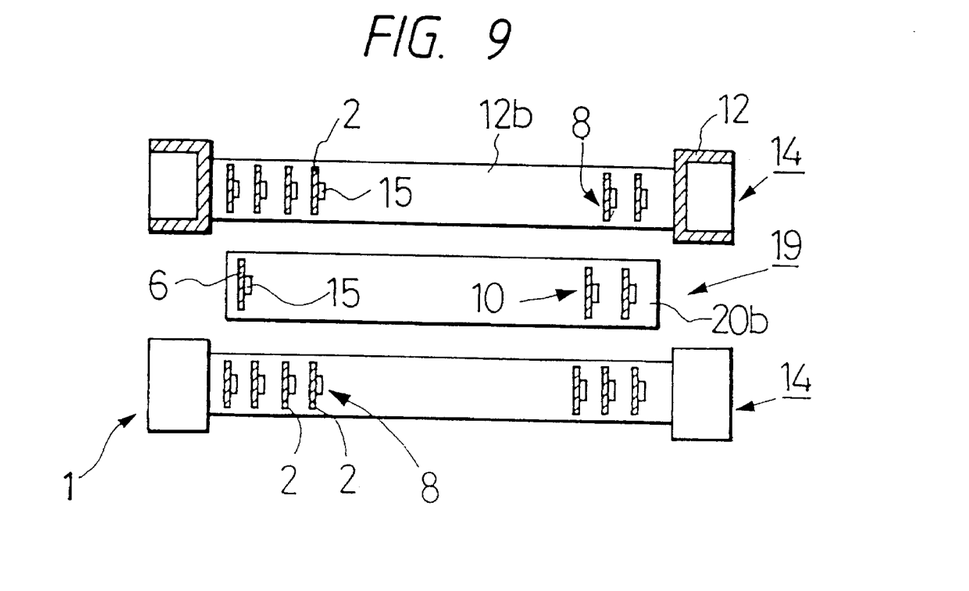
FIG. 9 is a sectional view showing an electrostatic precipitator in which the dust-collecting block of FIG. 7 and the discharge block of FIG. 8 are combined.

A discharge block 19 is interposed between a pair of dust-collecting blocks 14, as shown in FIG. 9, to construct the minimum unit of the electrostatic precipitator 1. The electrostatic precipitator 1, thus constructed, can be large-sized (having a height of about 10 m, for example), because no danger arises from warping of the electrodes, even when the dust-collecting electrodes 2 and the discharge electrodes 6 are as long as several meters. Incidentally, the mounting operation is easier than the first-mentioned embodiment and does not require any spacers.

In addition, the upper frames 12a or 20a of the dust-collecting and discharge blocks may be equipped with hooks instead of the mounting brackets 15. The hooks suspend the upper portions of the dust-collecting electrodes 2 and the discharge electrodes 6 to tension the electrodes 2 and 6, while the lower portions of the electrodes 2 and 6 are adjusted and fixed.

According to the constitution of the present invention thus far described, the dust-collecting electrode groups and the discharge electrode groups, formed as dust-collecting and discharge blocks, can be easily assembled into a casing. As a result, it is possible to make a casing having a small size and a strong structure, or to make a casing having a large size, by attaching the dust-collecting electrodes or the discharge electrodes directly to the casing, thereby facilitating the installing operation.

In addition, the dust particles are intensely attracted to the downstream edges of the electrodes of the dust-collecting electrode group upstream of the discharge electrode group. Even if a large quantity of dust particles are deposited so that the particles easily detach from the dust-collecting electrodes and float downstream, the particles will be pulled back upstream by the attractive forces. As a result, the deposited dust particles tend to drop downwards due to gravity, while being obstructed by neither the dust-collecting electrodes nor the discharge electrodes, thus improving the air cleaning efficiency.

By providing the first and second spacing-adjusting means, i.e., the spacers between electrodes, the spacing between the electrodes of the dust-collecting and discharge electrode groups can be easily narrowed. In addition, the spacing between the dust-collecting and discharge electrode groups can also be narrowed. Thus, it is possible to provide an electrostatic precipitator having excellent performance by sufficiently exploiting the multistage construction.

What is claimed is:

1. An electrostatic precipitator, comprising:
 a plurality of dust-collecting electrode groups, each dust-collecting electrode group comprising:
  a plurality of elongated dust-collecting electrodes,
  first spacing adjusting means for spacing the plurality of dust-collecting electrodes of a dust-collecting electrode group at a uniform spacing from one another,
  wherein faces of the plurality of dust-collecting electrodes are arranged parallel to one another, and parallel to a gas flow direction of the electrostatic precipitator;
 at least one discharge electrode group, each discharge electrode group comprising:
  a plurality of elongated discharge electrodes,
  second spacing adjusting means for spacing the plurality of discharge electrodes of a discharge electrode group at a uniform spacing from one another,
  wherein faces of the plurality of discharge electrodes are arranged parallel to one another and parallel to the gas flow direction of the electrostatic precipitator; and
 wherein each discharge electrode group is located between a pair of dust-collecting electrode groups, one of the pair of dust-collecting electrode groups being located upstream of the discharge electrode group in the gas flow direction, the other of the pair of dust-collecting electrode groups being located downstream of the discharge electrode group in the gas flow direction.

2. The electrostatic precipitator of claim 1, wherein the spacing between dust-collecting electrodes is smaller for dust-collecting electrode groups located on a downstream side relative to dust-collecting electrode groups located on an upstream side.

3. The electrostatic precipitator of claim 2, wherein a spacing between a discharge electrode group and a dust-collecting electrode group located on a downstream side of the discharge electrode group is smaller than a spacing between the discharge electrode group and a dust-collecting electrode group located on an upstream side of the discharge electrode group.

4. The electrostatic precipitator of claim 2, wherein the at least one discharge electrode group includes plural discharge electrode groups, and wherein the spacing between the discharge electrodes of each discharge electrode group is smaller for discharge electrode groups located on the downstream side relative to discharge electrode groups located on the upstream side.

5. The electrostatic precipitator of claim 4, wherein a spacing between a discharge electrode group and a dust-collecting electrode group located on a downstream side of the discharge electrode group is smaller than a spacing between the discharge electrode group and a dust-collecting electrode group located on an upstream side of the discharge electrode group.

6. The electrostatic precipitator of claim 1, wherein the at least one discharge electrode group includes plural discharge electrode groups, and wherein the spacing between the discharge electrodes of each discharge electrode group is smaller for discharge electrode groups located on a downstream side relative to discharge electrode groups located on an upstream side.

7. The electrostatic precipitator of claim 1, wherein a spacing between a discharge electrode group and a dust-collecting electrode group located on a downstream side of the discharge electrode group is smaller than a spacing between the discharge electrode group and a dust-collecting electrode group located on an upstream side of the discharge electrode group.

8. The electrostatic precipitator of claim 1, wherein the dust-collecting electrodes are rectangular flat plates.

9. The electrostatic precipitator of claim 8, wherein the first spacing adjusting means comprises spacers that are arranged between adjacent dust-collecting electrodes of a dust-collecting electrode group.

10. The electrostatic precipitator of claim 9, further comprising a plurality of elongated comb-shaped members having a plurality of projections, each comb-shaped member being mounted adjacent a corresponding dust-collecting electrode group so that the projections of the comb-shaped member extend between the dust-collecting electrodes of the corresponding dust-collecting electrode group.

11. The electrostatic precipitator of claim 8, wherein the dust-collecting electrodes have a width extending in the gas flow direction, and wherein a spacing between adjacent dust-collecting electrodes of a dust-collecting electrode group is smaller than the width of the dust-collecting electrodes.

12. The electrostatic precipitator of claim 1, wherein the discharge electrodes are substantially rectangular flat plates having upstream and downstream edges and wherein the upstream and downstream edges of each discharge electrode have saw-toothed portions.

13. The electrostatic precipitator of claim 12, wherein the second spacing adjusting means comprises spacers that are arranged between adjacent discharge electrodes of a discharge electrode group.

14. The electrostatic precipitator of claim 13, further comprising at least one guide rod, each guide rod being mounted adjacent a corresponding discharge electrode group so that the guide rod touches an edge of each of the plurality of discharge electrodes of the corresponding discharge electrode group.

15. The electrostatic precipitator of claim 12, wherein the discharge electrodes have a width extending in the gas flow direction, and wherein a spacing between adjacent discharge electrodes of a discharge electrode group is smaller than the width of the discharge electrodes of the discharge electrode group.

16. The electrostatic precipitator of claim 15, wherein the dust-collecting electrodes are rectangular flat plates having a width extending in the gas flow direction, and wherein the width of the discharge electrodes is approximately twice the width of the dust-collecting electrodes.

17. The electrostatic precipitator of claim 1, wherein the dust-collecting electrodes are rectangular flat plates having upstream and downstream edges, the discharge electrodes are substantially rectangular flat plates having saw-toothed portions at upstream and downstream edges thereof, wherein the dust-collecting electrodes and the discharge electrodes have a width extending in the gas flow direction, and wherein the spacing between the downstream edges of the dust-collecting electrodes of an upstream-most dust-collecting electrode group and the upstream edges of the discharge electrodes of a discharge electrode group located on a downstream side of the upstream-most dust-collecting electrode group is approximately twice the width of the dust-collecting electrodes.

18. The electrostatic precipitator of claim 1, wherein each dust-collecting electrode group is further comprised of a dust-collecting mounting frame, each of the plurality of dust-collecting electrodes of a dust-collecting electrode group being mounted on the dust-collecting mounting frame, the dust-collecting mounting frame being mounted on a casing.

19. The electrostatic precipitator of claim 18, wherein each discharge electrode group is further comprised of a discharge mounting frame, each of the plurality of discharge electrodes of a discharge electrode group being mounted on the discharge mounting frame, the discharge frame being mounted on the casing.

20. The electrostatic precipitator of claim 19, further comprising third spacing adjusting means for spacing apart the plurality of dust-collecting electrode groups and the at least one discharge electrode group, the third spacing adjusting means comprising a plurality of brackets mounted on the casing, the dust-collecting and discharge mounting frames being mounted on corresponding brackets.

21. The electrostatic precipitator of claim 20, wherein the third spacing adjusting means sets the spacing between a discharge electrode group and a dust-collecting electrode group located on a downstream side of the discharge electrode group to be smaller than a spacing between the discharge electrode group and a dust-collecting electrode group located on an upstream side of the discharge electrode group.

22. The electrostatic precipitator of claim 1, wherein at least one end of each of the plurality of dust-collecting electrodes are suspended from a plurality of hooks.

23. The electrostatic precipitator of claim 1, wherein at least one end of each of the plurality of discharge electrodes are suspended from a plurality of hooks.

24. The electrostatic precipitator of claim 1, further comprising a unit frame having a plurality of unit mounting spaces, wherein at least two dust-collecting electrode groups and at least one discharge electrode group are mounted in each of the plurality of unit mounting spaces.

25. An electrostatic precipitator, comprising:

a casing;

a plurality of dust-collecting electrode groups mounted within the casing, each dust-collecting electrode group comprising a plurality of elongated dust-collecting electrodes arranged at a uniform spacing from one another and wherein the faces of the plurality of dust-collecting electrodes are arranged parallel to one another, and parallel to a gas flow direction of the electrostatic precipitator;

at least one discharge electrode group mounted within the casing, each discharge electrode group comprising a plurality of elongated discharge electrodes arranged at a uniform spacing from one another, wherein faces of the plurality of discharge electrodes are arranged parallel to one another and parallel to the gas flow direction of the electrostatic precipitator;

a plurality of dust-collecting electrode mounting brackets attached to the casing, each of the plurality of dust-collecting electrodes of the plurality of dust-collecting electrode groups being mounted on a corresponding pair of dust-collecting electrode mounting brackets; and wherein each discharge electrode group is located between a pair of dust-collecting electrode groups, one of the pair of dust-collecting electrode groups being located upstream of the discharge electrode group in the gas flow direction, the other of the pair of dust-collecting electrode groups being located downstream of the discharge electrode group in the gas flow direction.

26. The electrostatic precipitator of claim 25, further comprising at least one discharge frame and a plurality of discharge electrode mounting brackets attached to the at least one discharge frame, wherein each of the plurality of discharge electrodes of a discharge electrode group are mounted on a corresponding pair of discharge electrode mounting brackets attached to a discharge frame.

27. The electrostatic precipitator of claim 26, wherein at least one of each corresponding pair of dust-collecting electrode mounting brackets has an elongated slot, through which a screw is passable to affix a corresponding dust-collecting electrode to the dust-collecting electrode mounting bracket, and wherein at least one of each corresponding pair of discharge electrode mounting brackets has an elongated slot, through which a screw is passable to affix a corresponding discharge electrode to the discharge electrode mounting bracket.

* * * * *